United States Patent
Klassen

(10) Patent No.: US 7,295,215 B2
(45) Date of Patent: Nov. 13, 2007

(54) METHOD FOR CALCULATING COLORANT ERROR FROM REFLECTANCE MEASUREMENT

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 442 days.

(21) Appl. No.: 10/923,614

(22) Filed: Aug. 20, 2004

(65) Prior Publication Data

US 2006/0038828 A1 Feb. 23, 2006

(51) Int. Cl.
G09G 5/02 (2006.01)
G06K 9/00 (2006.01)
(52) U.S. Cl. .................................... 345/604; 382/167
(58) Field of Classification Search ................ 345/604; 382/167
See application file for complete search history.

(56) References Cited

U.S. PATENT DOCUMENTS

| | | | |
|---|---|---|---|
| 4,583,116 A | 4/1986 | Hennig et al. | |
| 5,883,644 A | 3/1999 | Nicoloff et al. | |
| 6,072,591 A | 6/2000 | Harrington | |
| 6,266,438 B1 | 7/2001 | Metcalfe et al. | |
| 6,301,025 B1 | 10/2001 | DeLean | |
| 6,621,604 B2 | 9/2003 | DeLean | |
| 6,721,063 B1 | 4/2004 | Harrington | |
| 7,030,888 B1* | 4/2006 | Edge et al. ............... | 345/604 |
| 2001/0017627 A1 | 8/2001 | Marsden et al. | |
| 2002/0029715 A1 | 3/2002 | Ogatsu et al. | |
| 2003/0048945 A1* | 3/2003 | Tamagawa ................ | 382/167 |
| 2003/0090691 A1 | 5/2003 | Okamoto | |
| 2003/0189716 A1 | 10/2003 | Tsuji et al. | |

FOREIGN PATENT DOCUMENTS

| | | |
|---|---|---|
| EP | 0290887 B1 | 1/1994 |
| EP | 0825762 A2 | 2/1998 |
| EP | 0889640 A2 | 1/1999 |
| EP | 0615379 B1 | 5/1999 |
| EP | 0700198 B1 | 1/2000 |
| EP | 0817468 B1 | 4/2002 |
| EP | 0779736 B1 | 6/2004 |
| GB | 2388268 A | 11/2003 |
| JP | 01245173 | 9/2001 |
| WO | WO 1996000411 A1 | 1/1996 |
| WO | WO 1998058493 A1 | 12/1998 |
| WO | WO 2000065568 A1 | 11/2000 |

OTHER PUBLICATIONS

Raja Balasubramanian, Martin S. Maltz, "Refinement of Printer Transformations Using Weighted Regression", 334-340 /SPIE vol. 2658.

* cited by examiner

Primary Examiner—Kee M. Tung
Assistant Examiner—Aaron M. Richer
(74) Attorney, Agent, or Firm—Faye Sharpe LLP

(57) ABSTRACT

Color error associated with an image rendered by a rendering device is calculated in the no more than N−1 dimensions of an associated color sensor color space. The color error is assumed to be small. A differential of a mapping from an N dimensional rendering device color space to the associated color sensor color space is used to calculate a colorant error in the N dimensions of the rendering device color space. Where necessary, appropriate assumptions are used to constrain an underdetermined system of equations. Where calculated colorant error is unreasonable, the calculated colorant error is clipped and colorant error is recalculated based on the clipped value.

19 Claims, 2 Drawing Sheets

METHOD FOR CALCULATING COLORANT ERROR FROM REFLECTANCE MEASUREMENT

BACKGROUND

The present exemplary embodiment relates to color measurement. It finds particular application in conjunction with image rendering devices wherein colors are rendered with a higher number of colorants or color dimensions than are included in an available color measurement signal, and will be described with particular reference thereto. However, it is to be appreciated that the present exemplary embodiment is also amenable to other like applications.

Most readily available color sensors are based on the three primary colors (i.e.; red, green and blue). Light reflected from an image or object is filtered or refracted according to its wavelength. Light sensors such as photo diodes and photo transistors or charge coupled devices are positioned to receive the filtered or refracted light. The sensors generate signals according to the intensity of the light that reaches them. Some sensors report these color signals in terms of red, green and blue intensities. Other sensors include processing elements for converting the received intensities into values in a device independent color space, such as that known as L*, a*, b*. In either case, these color sensors report color measurements in three dimensions (e.g., R, G, B or L*, a*, b*).

Most color printers or rendering devices produce images using at least four colorants. For example, many color printers and color copiers render images using cyan (C), magenta (M), yellow (Y) and black (K) toners or inks to render images. Therefore, for purposes of process control, machine diagnostics and machine monitoring, it would be beneficial if color error measurements were available in terms of the four dimensions or separations (CMYK) in which these rendering devices operate. However, color sensors that report color in four color space dimensions (e.g., CMYK) are not readily available and converting three dimensional color space color measurements to four dimensions is problematic. The set of equations for converting a three dimensional color description to a four or more dimensional color description is underdetermined. Any particular measurement or error measurement in a three dimensional color space can correspond to an infinite number of combinations of colorant in a four or more dimensional rendering device color space. For example, from a purely mathematical standpoint an error measured in RGB or L*, a*, b* can be associated with, for example, a combination of errors in the amount of cyan, magenta and yellow colorant laid down in an image or may be associated with an error in only the black separation or dimension.

Due to this uncertainty, there has been no known (general) method to convert from a difference between the measured (scanned) trichromatic values and desired trichromatic values to a difference between the specified or input colorant values (typically CMYK) and the amount of CMYK that actually or apparently adhered to a target sheet or page. The only available alternative method for determining a difference between desired colorant amounts and actual colorant amounts, in systems that use four or more colorants, has been to introduce at least one additional sensor. However, this adds to system design, manufacturing and servicing costs.

Therefore, there has been a desire for a method for calculating error in an N-dimensional color space (e.g., the four dimensions of a CMYK rendering device color space) from errors determined in an N−1 or fewer dimensional color space of a color sensor (such as, for example, a three dimensional RGB or L*, a*, b* color space reflectance sensor).

BRIEF DESCRIPTION

A method for calculating N dimensional colorant error from N−1 (or fewer) dimensional reflectance measurements can include minimizing a sum of the squares of the predicted errors in all combined separations. This is equivalent to saying, for example, that it is more likely to have an error of 10 units in K than to have the equivalent amount of error in C, M and Y, balanced to give the same change in reflectance. Some embodiments include simplifications based on a recognition that if zero colorant is specified, as an input or part of a desired color description, in one or more separations, the error in that separation is unlikely to be non-zero. In some embodiments, if an error predicted or calculated for a separation, when added to the amount of colorant specified as an input in that separation, exceeds the maximum that could be printed for that separation, it is recognized that the error is un-physically large and should be clipped. In that case other the predicted or calculated errors in the remaining separations are recalculated to compensate or adjust for the clipping.

An exemplary embodiment includes a method for calculating rendering error in a rendering device color space having N dimensions, from measurements in a sensor color space, having no more than N−1 dimensions. The method includes predetermining (including predetermining by receiving) a mapping from coordinates in the N dimensional rendering device color space to coordinates in the sensor color space having no more than N−1 dimensions and receiving a color description. Receiving the color description can include receiving a color description from an internal source. For example, the color description can be received in the rendering device color space coordinates and/or the sensor device color space coordinates. If the color description is received in sensor color space coordinates, the method can include converting the color description to rendering device color space coordinates. The conversion can be based on the predetermined mapping. This conversion generates a converted color description. Additionally, the method includes rendering an image based on the received color description or the converted color description (as appropriate) and measuring a color of the rendered image. The measurement generates a measurement in sensor color space coordinates. The method further includes calculating a rendering error in rendering device color space coordinates based on the predetermined mapping, the received color description and/or the converted color description and the measurement.

DETAILED DESCRIPTION

Figure 1:
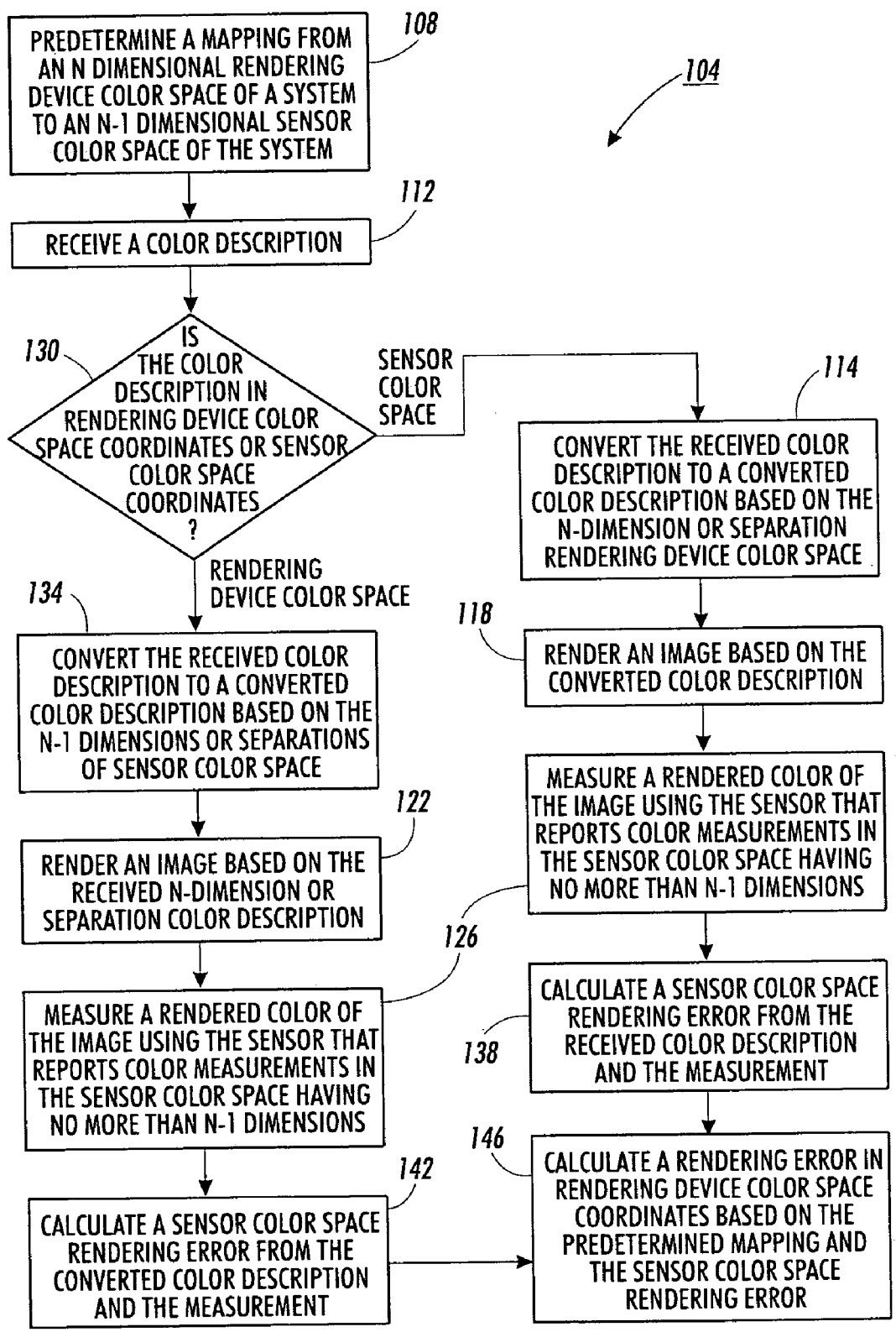
FIG. 1 is a flow chart outlining a method for calculating rendering error in a rendering device color space having N dimensions from measurements in a sensor color space having no more than N−1 dimensions.

Referring to FIG. 1, a method 104 for calculating rendering error in a rendering device color space having N dimensions from measurements in a sensor color space having no more than N−1 dimensions includes predetermining 108 a mapping from the N dimensional rendering device color space to the no more than N−1 dimensional sensor color space and receiving 112 or determining a color description. If necessary, the received 112 or determined color description is converted 114 to a color description in the N dimensional rendering device color space. The method 104 further includes rendering an image 118, 122 based on the converted 114 color description or on the received 112 color description and measuring 126 a rendered color of the image using a sensor that reports color measurements in a sensor color space having no more than N−1 dimensions.

It would be necessary to convert 114 the received color description if 130 the received 112 color description is not in the N coordinates, dimensions or separations of the rendering device color space. For example, the received color description may be in the no more than N−1 dimensions or coordinates of the sensor color space. If 130 the received 112 color description is in the N dimensional coordinates of the rendering device color space, then of course, it would not be necessary to convert 114 the received color description to the rendering device color space.

However, as is explained below, it would be necessary to convert 134 the received color description to a converted color description based on the no more than N−1 dimensions or separations of the sensor color space.

The received 112 or determined color description is needed in terms of both the rendering device color space and the sensor color space. The received 112 color description is needed in the rendering device color space (N-dimensions) so that the rendering device can render 118, 122 the related image. The input or received 112 color description is needed in the coordinates of the sensor color space so that the input or received color description 112 can be compared to the measured 126 color of the rendered 118, 122 image.

For example, if 130 the received 112 color description is in sensor color space coordinates (N−1 dimensions or fewer), then a sensor color space rendering error is calculated 138 from the received 112 color description and the result of the measurement 126 of the rendered color of the image. If 130 the received 122 color description is in the coordinates of the rendering device color space (N dimensions, e.g., CMYK) then the sensor color space rendering error is calculated 142 from the converted 134 color description based on the sensor color space. In either case, a rendering error in rendering device color space coordinates is calculated 146 based on the predetermined 108 mapping and the calculated 138 or 142 sensor color space rendering error.

An exemplary predetermined 108 mapping from an N dimensional rendering device color space to a no more than N−1 dimensional sensor color space can be, for example, a mapping from a machine dependent CMYK color space to an L*, a*, b* color space of a sensor. Another example of a predetermined 108 mapping is a mapping from a CMYK color space to an RGB color space of a sensor.

Some rendering devices use more than four colorants to render an image. For instance, HI-FI rendering devices are known to use 5-9 colorants. In such devices, a predetermined 108 mapping could be a mapping from a 5-9 dimensional rendering device color space to a three dimensional color space of an associated color sensor.

For example, the mapping can be predetermined 108 through a calibration procedure. For instance, a color description including four values (e.g., one for each of C, M, Y and K) of a rendering device color space is selected or generated. Based on this selected or generated color description, an image, for example a color patch, is rendered. A sensor is used to measure the color of the rendered color patch and a look-up table entry, indexed by the CMYK values, is made based on the measurement value received from the sensor (e.g., an L*, a*, b* or RGB value). This process is repeated with other CMYK values and patches until the look-up table includes enough information to satisfactorily describe the relationship between CMYK values and sensor space values. Entries do not have to be created for every possible combination of CMYK values. For instance, if needed, sensor color space values can be determined for rendering device color space values that are not included in the table through interpolation.

As indicated above, receiving 112 a color description can include receiving a color description in rendering device color space or in the coordinates of the sensor color space. The received 112 color description can be part of a job description such as a main or production job description or a diagnostic job description. For instance, a diagnostic job description may include one or more color patches or color sweeps which include one or more color descriptions.

If 130 the received 112 color description is in coordinates of the rendering device color space then converting 134 the received color description to a converted color description based on the no more than N−1 dimensions (or separations) of the sensor color space can include using the predetermined 108 mapping to do the conversion. For instance, CMYK values of the received 112 color description are used as an index into a look-up table including the predetermined 108 mapping information. The converted color description is either taken directly from an entry in a look-up table or an interpolation is performed between nodes of the table associated values closest to the values of the received 112 color description. In that case, the result of the interpolation is used as the converted color description.

As, explained above, if the received 112 color description is in coordinates or dimensions of the sensor color space then the conversion 114 of the received color description to the converted color description based on the N dimensions or separations of the rendering device color space takes place. This conversion 114 can also be based on the predetermined 108 mapping.

For example, the predetermined 108 mapping from rendering device color space to sensor color space is used to generate an inverse mapping. For example, information from the predetermined 108 mapping is combined with information regarding an Under Color Removal/Grey Component Replacement (UCR/GCR) strategy to generate the inverse mapping. The inverse mapping can be used to transform the input, desired or received 112 color description (in sensor color space coordinates) to a desired converted color description in the N dimensions or separations of the rendering device color space.

If 130 the received 112 color description is in terms the rendering device color space then an image is rendered 122 based directly on the received 112 color description.

If 130 the received 112 color description is based on some other color space, such as, for example, the sensor color space then the image is rendered 118 based on the converted 114 color description.

In either case, a measurement 126 is made of a color of the rendered image. The measurement 126 is made with a color sensor (e.g. 212 of FIG. 2) of the system. Therefore, the measurement is in the terms of the no more than N−1 dimensions of the sensor color space.

A comparison is made between the color measurement 126 and the received 112 desired or generated input color description. For example, if 130 the received 112 color description is in terms of the sensor color space then a comparison 138 is made between the received 112 color description and the measured 126 color. For instance, the comparison includes a subtraction or difference determination between sensor color space coordinates of the measured 126 and the received 112 color descriptions.

If 130 the received 112 color description is in terms of the (N dimensional) rendering device color space then the comparison or calculation 142 is based on the converted 134 color description based on the (no more than N−1 dimension) sensor color space. Again, the desired color (134) is compared to or subtracted from the measured 126 color description. In this regard, the rendering error in rendering device color space coordinates is calculated 146 based on the predetermined 108 mapping and the sensor color space rendering error determined by the measurement 126 and calculation 138, 142.

For example, the rendering error in rendering device color space is calculated 146 by establishing an underdetermined system of equations relating errors expressed in sensor color space coordinates to errors expressed in rendering device color space coordinates. The underdetermined system of equations is based on the predetermined 108 mapping. An appropriate constraint is applied to the underdetermined system of equations in order to generate a determined set of equations. The determined set of equations is solved based on the determined or calculated 138, 142 sensor color space rendering error. The solution to the equations includes the rendering device color space rendering error.

For example, establishing the underdetermined system of equations can include computing a differential relating small changes in positions in the sensor color space to small changes in positions in the rendering device color space. This differential computation may be based on the predetermined 108 mapping from the N dimensional rendering device color space to the no more than N−1 dimensional sensor color space. The established system of equations relates sensor color space rendering error to the computed differential and to unknown error expressed in rendering device color space coordinates.

As will be described in greater detail below, applying an appropriate constraint to the undetermined system of equation can include requiring that the solution to the underdetermined system of equations be one that minimizes the sum of squares of errors in the N dimensions of the rendering device color space.

Under certain circumstances, solving the underdetermined set of equations may be simplified. For example, where the received 112, input, desired or expected color description is for a color that would require zero colorant be laid down in one or more separations, that information alone may provide a determined set of equations.

In some circumstances, solving the determined set of equations may require several iterations. For example, as will be explained in greater detail below, an initial solution to the determined set of equations may include an unphysically large error in at least one separation. That is, a solution may include an error, that if combined with the associated input, desired or expected color description, in a manner that might provide a compensated input value, the resultant combination may call for an amount of colorant that can not be provided. For example, the compensated might call for more than 100% or less than zero percent of an allowed range of colorant amounts. Under these circumstances solving the determined set of equations can include clipping the error value that places the combined value outside the allowed range. For example, in an eight bit system, the error value for a particular separation might be clipped so that when the error value is combined with the related separation value associated with the received 112 input or desired color, the combined value is no more than 255 and no less than 0. This clipping process includes establishing and solving a reduced set of equations based on, among other things, the clipped value. This process can be repeated until no values require clipping or until error values for all the separations in the rendering device color space have been clipped.

In one embodiment, the predetermined 108 mapping takes the form of a color printer characterization table mapping from CMYK to L*a*b*. The table is, for example, of dimensions in the range of 8×8×8×8 to 16×16×16×16. The table can be used in the characterization process to derive, by interpolation, a table mapping from L*a*b* to CMYK. To do so requires a UCR/GCR strategy, which defines how black (K) is generated and how the other separations are reduced to compensate.

In these embodiments, calculating 146 a rendering error can include differentiating the predetermined 108 mapping from CMYK to L*a*b* in all dimensions, yielding a matrix in the form:

$$M = \begin{bmatrix} \frac{\partial L^*}{\partial c} & \frac{\partial L^*}{\partial m} & \frac{\partial L^*}{\partial y} & \frac{\partial L^*}{\partial k} \\ \frac{\partial a^*}{\partial c} & \frac{\partial a^*}{\partial m} & \frac{\partial a^*}{\partial y} & \frac{\partial a^*}{\partial k} \\ \frac{\partial b^*}{\partial c} & \frac{\partial b^*}{\partial m} & \frac{\partial b^*}{\partial y} & \frac{\partial b^*}{\partial k} \end{bmatrix} = \begin{bmatrix} M_{Lc} & M_{Lm} & M_{Ly} & M_{Lk} \\ M_{ac} & M_{am} & M_{ay} & M_{ak} \\ M_{bc} & M_{bm} & M_{by} & M_{bk} \end{bmatrix} \quad (1)$$

For instance, where the predetermined 108 mapping is defined by a look-up table, the differentiating can be numerical differentiation (i.e., subtracting adjacent nodes and dividing by their separation), at each node of the table, or at nodes of the table that are of immediate interest. We refer to the result of differentiation at a given node as M (the Jacobian). Interpolation is used to determine values between the nodes of the look-up table The differentiation can create a lookup table of derivatives. Each entry in the table contains a matrix such as the one above (M), giving estimates of the partial derivatives for the corresponding region of color space. The table is indexed by location in CMYK color space. For instance, an entry in the table is determined by taking the difference between values associated with adjacent nodes, and dividing by their separation. For example, suppose we wish to find $\partial L^*/\partial C$ at a point with C=32, M=m, Y=y, K=k in a table with nodes at C=0, 16, 32, . . . 256. We take the value of L* associated with the node at C=16, M=m, Y=y, K=k, and subtract that from the value of L* associated with the node at C=48, M=m, Y=y, K=k. We divide the result by 32, thereby obtaining the estimate of $\partial L^*/\partial C$ at C=32, M=m, Y=y, K=k. If the color conversion were a smooth quadratic function between equally spaced nodes, this would be the exact derivative at the midpoint node. Alternatively, higher order functions could be assumed in computing the derivative.

For values of the derivative between nodes, one can use linear interpolation (or pentahedral interpolation-the natural extension to four dimensions of the well-known method of tetrahedral interpolation in three dimensions), which follows the quadratic assumption, or one could use higher or lower order interpolation. With lower order interpolation, the tetrahedral interpolation used in interpolating the original lookup table is assumed to be "truth": the slope between the nodes is constant and given by the difference between values at adjacent nodes divided by their separation. In this case the slope at the nodes is undefined, but the average approach, equivalent to the approach described above, provides a good stand-in. With higher order interpolation, the slope can generally be directly determined from the coefficients defining the interpolant, and the values in between nodes then follow from the interpolating polynomial.

In an alternative embodiment, the mapping might be defined in terms of continuous function f: (C,M,Y,K)→(L*, a*,b*) (rather than as a sampled function to be interpolated). If the function f has a differentiable form, the partial derivatives may be determined analytically.

It may also be that the mapping itself is not readily derived. Because it is not the mapping itself that is needed but rather the Jacobian, yet another approach is to sample the change in the mapping at various locations in colour space and to fit a parametric function through the samples. In this way samples of the Jacobian are used to derive an estimate of the Jacobian itself throughout space.

Given the matrix M determined from the derivative table, and the predetermined 108 mapping we can determine for any given received 112 input CMYK the expected L*a*b* ($C_1$) and the measured L*a*b* ($C_2$).

The difference, then is given by $\Delta E = C_2 - C_1 = (\Delta L^*, \Delta a^*, \Delta b^*)$. Note that the E is bold, to denote that it is a vector and not a scalar quantity, such as the Euclidean difference $\Delta E$.

Now we define x as the vector $(\Delta c, \Delta m, \Delta y, \Delta k)^T$: the difference between the intended and actual CMYK. Given a smooth, continuous characterization function, perfectly characterizing the mapping from CMYK to L*a*b*, then for errors of small magnitude, it is valid to say $$Mx = \Delta E. \tag{2}$$

An assumption here is local linearity. As the magnitude of the error grows, the assumption of linearity becomes worse. We wish to find a reasonable value of x satisfying equation (2).

The matrix M has only 3 rows, so the system defined in equation (2) is underdetermined. This makes sense, since there are many CMYK values that can produce a given L*a*b*, and hence it is logical that many CMYK errors could produce the same L*a*b* error.

In order to solve the system we add a constraint. For example, we augment the matrix with the right-hand side of equation (2), as if to perform Gaussian elimination or Gauss-Jordan elimination:

$$H = \begin{bmatrix} M_{Lc} & M_{Lm} & M_{Ly} & M_{Lk} & \Delta L \\ M_{ac} & M_{am} & M_{ay} & M_{ak} & \Delta a \\ M_{bc} & M_{bm} & M_{by} & M_{bk} & \Delta b \end{bmatrix}. \tag{3}$$

Next, reduce the augmented matrix to row-reduced echelon form, which will give a system of the form:

$$H = \begin{bmatrix} 1 & 0 & 0 & a & b \\ 0 & 1 & 0 & c & d \\ 0 & 0 & 1 & e & f \end{bmatrix}. \tag{4}$$

This matrix gives us the defining relations:

$$\alpha + a\delta = b$$
$$\beta + c\delta = d, \text{ and} \tag{5}$$
$$\gamma + e\delta = f$$

which are still underdetermined. However the defining relations of equation (5) are simpler than the initial relationship. The Greek letters α, β, γ, and δ are the coefficients of the amount of error in each of the respective separations (c, m, y and k). We take the conservative approach that we would make the least possible change in the separations, thus minimizing $$\alpha^2 + \beta^2 + \gamma^2 + \delta^2 = (b - a\delta)^2 + (d - c\delta)^2 + (f - e\delta)^2 + \delta^2 \tag{6}$$
$$= (a^2 + c^2 + e^2 + 1)\delta^2 -$$
$$2(ab + cd + ef)\delta + b^2 + d^2 + f^2$$

This is minimized where the derivative with respect to δ is zero, such that δ is within the 0 . . . 1 range.

The derivative is given by $$2(a^2 + c^2 + e^2 + 1)\delta - 2(ab + cd + ef), \tag{7}$$

Setting that to zero, we obtain $$\delta = \frac{ab + cd + ef}{a^2 + c^2 + e^2 + 1}. \tag{8}$$

Substituting equation (8) back into equation (5) we may obtain the remaining values, thereby calculating 146 the rendering error in rendering device color space coordinates based on the predetermined mapping and the sensor color space rendering error.

Some embodiments address one or more exceptions or variations on this processing. For example, where one or more separation associated with the received 112 color description or with converted 114 color description (e.g., the input or desired color description) is zero, the error for that separation is assumed to be zero. While this may not be the case if a printer is generating unwanted stray background, there could be no correction for this problem. Without this constraint odd results may occur. For instance, variation in the scanned reflectance of the paper can register as an error.

Most of the time, the values of c, m, y and k that result from substituting (8) into (5) and then subtracting them from the initial values will yield new values of c, m, y and k that are within the 0 . . . 255 range (assuming that is the original range). Occasionally one would expect one or more to be out of range. Additionally when fewer than four separations are involved in the error computation, the system is either exactly determined (for three separations) or overdetermined (for two or one separation). These situations can be addressed by clipping.

For example, if any one correction or error value determined through equation (8), or the combination of equation (8) and (5), (when added to or combined with the initial input or received 112 value) is out of range, the estimate is physically impossible. Therefore, the value found to be out of range is clipped to be within the valid range. The system of equations is re-solved accordingly. For example, if c is out of range, and Δc' is the value after clipping, the equations are of the form:

$$\begin{bmatrix} M_{Lm} & M_{Ly} & M_{Lk} \\ M_{am} & M_{ay} & M_{ak} \\ M_{bm} & M_{by} & M_{bk} \end{bmatrix} \begin{bmatrix} \Delta m \\ \Delta y \\ \Delta k \end{bmatrix} = \begin{bmatrix} \Delta L - \Delta c' M_{Lc} \\ \Delta a - \Delta c' M_{ac} \\ \Delta b - \Delta c' M_{bc} \end{bmatrix}, \quad (9)$$

which is readily solved using Gaussian elimination or other well-known techniques. Similar matrix forms treat the other three cases of a single variable needing clipping. If, after clipping one variable, the solution to equation (9) requires that another variable be clipped, the matrix to solve is overdetermined. Thus, if c and then m need clipping, we obtain $$\begin{bmatrix} M_{Ly} & M_{Lk} \\ M_{ay} & M_{ak} \\ M_{by} & M_{bk} \end{bmatrix} \begin{bmatrix} \Delta y \\ \Delta k \end{bmatrix} = \begin{bmatrix} \Delta L - \Delta c' M_{Lc} - \Delta m' M_{Lm} \\ \Delta a - \Delta c' M_{ac} - \Delta m' M_{am} \\ \Delta b - \Delta c' M_{bc} - \Delta m' M_{bm} \end{bmatrix} \sim M'x' = b'. \quad (10)$$

The least square solution to this set of equations results from pre-multiplying both sides by the transpose of the matrix:

$$M'^T M'x' = M'^T b' \quad (11)$$

The matrix is now 2×2, and the vectors are both of length 2.

There remains the remote possibility that one or more separations will still need clipping, in which case the approach which took equation (10) to equation (11) is applied once more. This gives a single equation with one variable for the remaining separation, which may need to be clipped as well.

Note that various other constraints are possible, (rather than minimizing the sum of squares). For example, it might be known (or suspected) that none of the error is in one separation. In this case, the problem reduces to the case where one of the errors is clipped so that the error itself is zero. The problem is uniquely determined, as in the case (above) where exactly one separation required clipping. This extends naturally to the case where two or more separations are known to be error-free: these separations are treated as if they were clipped so that their errors are zero. Finally, if it is believed that all of the error is in one separation, but unknown which one, all four single-separation cases may be tried, with the case having least error accepted.

In a second embodiment, the predetermined 108 mapping takes the form of a color printer characterization encoded as a table mapping from CMYK to RGB. Processing proceeds in a similar manner. However, certain of the equations and structures are adjusted accordingly.

For example, in these embodiments, calculating 146 the rendering error can include differentiating the mapping from CMYK to RGB in all dimensions, yielding a matrix (Jacobian) of the form $$M = \begin{bmatrix} \frac{\partial R}{\partial c} & \frac{\partial R}{\partial m} & \frac{\partial R}{\partial y} & \frac{\partial R}{\partial k} \\ \frac{\partial G}{\partial c} & \frac{\partial G}{\partial m} & \frac{\partial G}{\partial y} & \frac{\partial G}{\partial k} \\ \frac{\partial B}{\partial c} & \frac{\partial B}{\partial m} & \frac{\partial B}{\partial y} & \frac{\partial B}{\partial k} \end{bmatrix} = \begin{bmatrix} M_{Rc} & M_{Rm} & M_{Ry} & M_{Rk} \\ M_{Gc} & M_{Gm} & M_{Gy} & M_{Gk} \\ M_{Bc} & M_{Bm} & M_{By} & M_{Bk} \end{bmatrix} \quad (12)$$

Given the matrix M derived from the derivative table and the predetermined 108 mapping, we can determine for any given received 112 input CMYK the expected RGB ($C_1$) and the measured RGB ($C_2$). The difference, then, is given by $\Delta C = C_2 - C_1 = (\Delta R, \Delta G, \Delta B)^T$.

Now define x as the vector $(\Delta c, \Delta m, \Delta y, \Delta k)^T$, which is the difference between the intended and actual CMYK. Given a smooth, continuous characterization function, perfectly characterizing the mapping from CMYK to RGB, then for errors of small magnitude, it is valid to say $$Mx = \Delta C. \quad (13)$$

We wish to find a reasonable value of x satisfying equation (13).

Again, the matrix M has only 3 rows, so the system defined in equation (13) is underdetermined.

Again, we augment the matrix with the right-hand side of equation (13), as if to perform Gaussian elimination or Gauss-Jordan elimination:

$$H = \begin{bmatrix} M_{Rc} & M_{Rm} & M_{Ry} & M_{Rk} & | & \Delta R \\ M_{Gc} & M_{Gm} & M_{Gy} & M_{Gk} & | & \Delta G \\ M_{Bc} & M_{Bm} & M_{By} & M_{Bk} & | & \Delta B \end{bmatrix}. \quad (14)$$

From here, calculating 146 the rendering error proceeds as before:

$$H = \begin{bmatrix} 1 & 0 & 0 & a & | & b \\ 0 & 1 & 0 & c & | & d \\ 0 & 0 & 1 & e & | & f \end{bmatrix}. \quad (15)$$

Gives us the defining relations:

$$\alpha + a\delta = b$$
$$\beta + c\delta = d, \text{ and} \quad (16)$$
$$\gamma + e\delta = f$$

which are still underdetermined.

We take the conservative approach that we would make the least possible change to the separations, thus minimizing $$\alpha^2 + \beta^2 + \gamma^2 + \delta^2 = (b - a\delta)^2 + (d - c\delta)^2 + (f - e\delta)^2 + \delta^2 \quad (17)$$
$$= (a^2 + c^2 + e^2 + 1)\delta^2 - 2(ab + cd + ef)\delta + b^2 + d^2 + f^2$$

Again, this is minimized where the derivative with respect to $\delta$ is zero, such that $\delta$ is within the 0 . . . 1 range. The derivative is given by $$2(a^2 + c^2 + e^2 + 1)\delta - 2(ab + cd + ef), \quad (18)$$

Setting that to zero, we obtain $$\delta = \frac{ab + cd + ef}{a^2 + c^2 + e^2 + 1}. \quad (19)$$

Substituting back into (16) we may obtain the remaining values.

Again, some embodiments address one or more exceptions or variations on this processing. For example, where one or more separations associated with the received 112 color description, or with a converted 114 color description (e.g., the input or desired color description) is zero, the error for that separation is assumed to be zero.

Most of the time, the values of c, m, y and k that result from substituting (19) into (16) and then subtracting them from the initial values will yield new values of c, m, y and k that are within the 0 . . . 255 range (assuming that is the original range). Occasionally one would expect one or more to be out of range. Additionally, when fewer than four separations are involved in the error computation the system is either exactly determined (for three separations) or overdetermined (for two or one separation). These situations can be addressed by clipping.

As in the prior case, if any one value (when added to the initial value) is out of range, the estimate is determined to be physically impossible. Therefore, the value found to be out of range is clipped to the valid range, and the system of equations is re-solved accordingly. For example, if c is out of range, and $\Delta c'$ is the value after clipping, the equations are of the form:

$$\begin{bmatrix} M_{Rm} & M_{Ry} & M_{Rk} \\ M_{Gm} & M_{Gy} & M_{Gk} \\ M_{Bm} & M_{By} & M_{Bk} \end{bmatrix} \begin{bmatrix} \Delta m \\ \Delta y \\ \Delta k \end{bmatrix} = \begin{bmatrix} \Delta R - \Delta c' M_{Rc} \\ \Delta G - \Delta c' M_{Gc} \\ \Delta B - \Delta c' M_{Bc} \end{bmatrix}, \quad (19)$$

which is readily solved using Gaussian elimination. Similar matrix forms treat the other three cases of a single variable needing clipping. If, after clipping one variable, the solution to (9) requires that another variable be clipped, the matrix to solve is overdetermined. Thus, if c and then m need clipping, we obtain:

$$\begin{bmatrix} M_{Ry} & M_{Rk} \\ M_{Gy} & M_{Gk} \\ M_{By} & M_{Bk} \end{bmatrix} \quad (20)$$

$$\begin{bmatrix} \Delta y \\ \Delta k \end{bmatrix} = \begin{bmatrix} \Delta R - \Delta c' M_{Rc} - \Delta m' M_{Rm} \\ \Delta G - \Delta c' M_{Gc} - \Delta m' M_{Gm} \\ \Delta B - \Delta c' M_{Bc} - \Delta m' M_{Bm} \end{bmatrix} \sim M'x' = b'.$$

The least square solution to this set of equations results from pre-multiplying both sides by the transpose of the matrix:

$$M'^T M'x' = M'^T b'. \quad (21)$$

The matrix is now 2×2, and the vectors are both of length 2.

There remains the remote possibility that one or more separations will still need clipping, in which case the approach which took equation (10) to equation (11) is applied once more. This gives a single equation with one variable for the remaining separation, which may need to be clipped as well.

In a third embodiment, in addition to a predetermined 108 mapping from CMYK to RGB there is an additional mapping from RGB to L*a*b*. Information from these two mappings can be used to predetermine 108 a mapping from CMYK to L*a*b*. This gives us two ways of obtaining L*a*b*: first, we can convert the input (i.e., received 112) CMYK values, and second, we can convert measured RGB values. By converting received 112 and measured 126 color descriptions to L*a*b* we can obtain a color difference vector $\Delta C$ as before, only this time it is computed as $(L^*_2 - L^*_1, a^*_2 - a^*_1, b^*_2 - b^*_1)$. Applying all of the same mathematics as described above, with this version of color difference vector, may produce an improved effect, as the difference is calculated in a visually meaningful space.

It should be noted that, while the above description assumes one must compute the Jacobian matrix M from information in an original mapping (e.g. from CMYK to L* a* b* or RGB), having the original mapping is not essential. The Jacobian (M) can be provided by some other means. For example the Jacobian (M) it could be provided by some external process.

Figure 2:
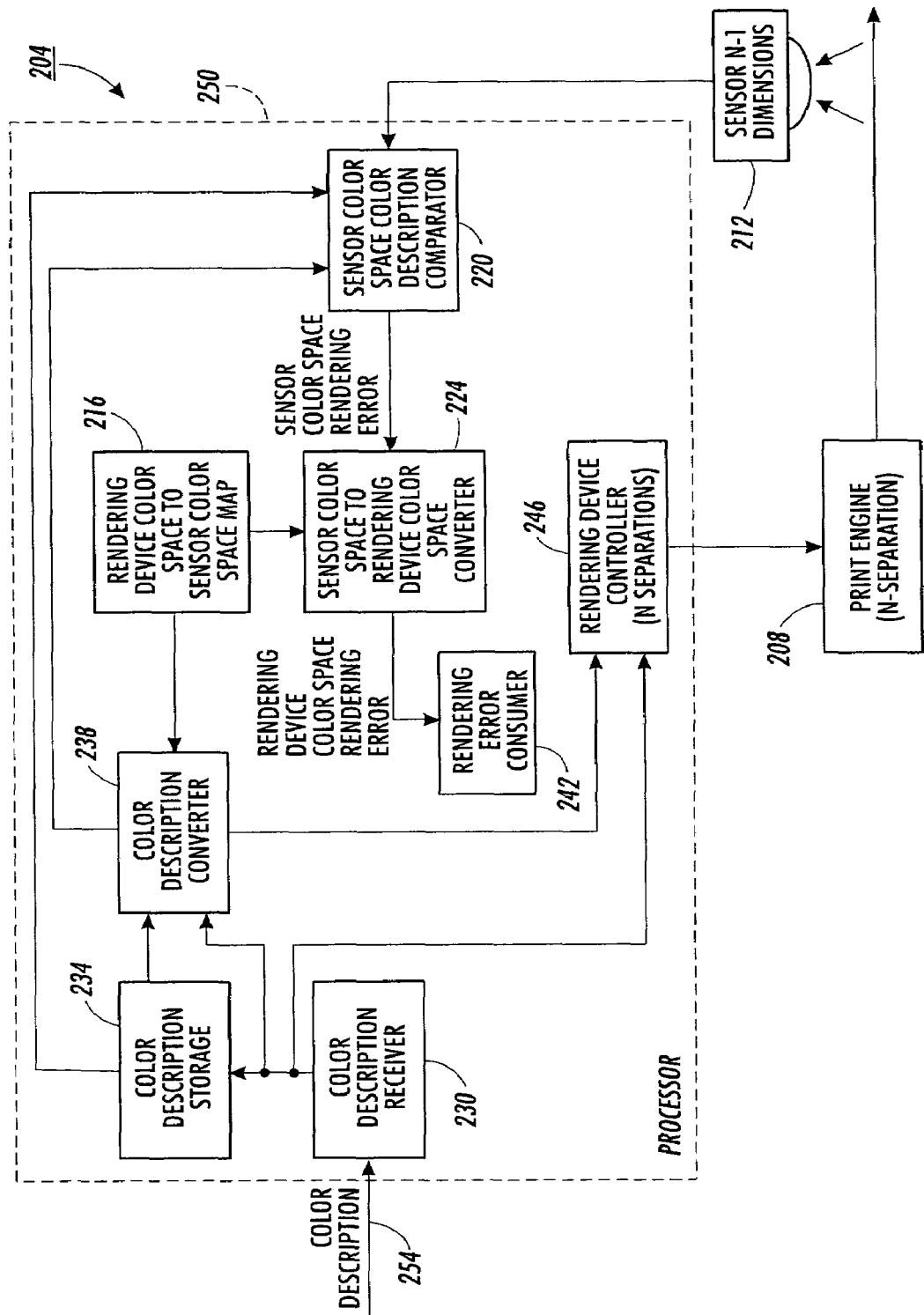
FIG. 2 is a block diagram of a system that is operative to calculate rendering error according to the method of FIG. 1.

Referring to FIG. 2, a document rendering system 204 that is operative to calculate colorant error from reflectance error includes a print engine 208 that is operative to render images using N rendering device color separations or dimensions, a color sensor 212 that is operative to measure or report color measurements in no more than N−1 dimensions and, optionally, a map 216 that provides information for transforming color descriptions based on the N rendering device color separations or dimensions to color descriptions based on the no more than N−1 sensor color space dimensions. The document rendering system 204 also includes a sensor color space color description comparator 220 and a sensor color space to rendering device color space converter 224.

Some embodiments include one or more of a color description receiver 230, a color description storage device 234, a color description converter 238 and a rendering error consumer 242.

A rendering device controller 246 controls the print engine 208 in rendering images. Many of the elements of the system 204 may be implemented in various combinations of hardware and software. For example, a processor including a microprocessor, a microcontroller and/or a digital signal processor, and memory devices, such as program storage, and temporary storage, for performing calculations, may perform the functions of the rendering device color space to sensor color space map 216, the sensor color space color description comparator 220, the sensor color space to rendering device color space converter 214, the color description receiver 230, the color description storage device 234, the color description converter 238, the rendering error consumer 242 and the rendering device controller 246. Alternatively, these functions may be distributed over multiple processors or performed by multiple components in a network.

The print engine 208 can be any print engine capable of rendering images with two or more colorants. In the exemplary embodiment the print engine 208 is a four colorant (e.g., CMYK) print engine, such as a color xerographic print engine or a color ink jet print engine. However, the print engine 208 may also be a two colorant print engine or a HI-FI print engine capable of producing images with five or more colorants.

The sensor 212 may be any kind of color sensor, such as a color scanner bar or a spectrophotometer. The method 104 and certain system elements (e.g., 220, 224) are beneficially applied when the sensor 212 reports color measurements in fewer dimensions than are used by the print engine (and controller 246) to render an image. Therefore, in the exemplary embodiment, the sensor 212 is described as reporting color measurements in no more than N−1 dimensions. For example, where the print engine 208 renders an image using four colorants, (e.g., CMYK) the sensor 212 reports color measurements in no more than three dimensions (e.g., RGB or L* a* b*).

The sensor color space color description comparator 220 calculates (e.g., 138, 142) a sensor color space rendering error. For example, the sensor color space color description comparator 220 receives a description of a measured color from the sensor 212 and receives a description of an input, target or desired color (described in terms of the sensor color space) and compares the measured color to the target color. For example, the input, target, or desired color is received from the color description storage device 234 or directly from the color description receiver 230. Alternatively, if a description of the desired or target color is not available in terms of the sensor color space, the color description comparator receives a sensor color space description of the target color from the color description converter 238. The comparison made by the color description comparator 220 can be any convenient kind of comparison. For example, the color description comparator 220 may determine a distance vector in the sensor color space describing a relationship between points in sensor color space described by the measurement (e.g., 126) received from the sensor 212 and the target or desired color. For example, the color description comparator 220 determines a $\Delta E$ between the two color descriptions. The sensor color space color description comparator 220 delivers the calculated (e.g., 138, 142) sensor color space rendering error to the sensor color space to rendering device color space converter 224.

The sensor color space to rendering device color space converter 224 calculates 146 a rendering error in rendering device color space coordinates based on information from the rendering device color space to sensor color space map 216 (e.g, the Jacobian of the map) and the sensor color space rendering error received from the color description comparator 220. For example, the sensor color space to rendering device color space converter 224 establishes an underdetermined system of equations relating rendering device color space rendering error to errors expressed in rendering device color space coordinates (N dimensions) through the differentiation of information from the map 216. For instance, the sensor color space to rendering device color space converter applies an appropriate constraint to the underdetermined system of equations (e.g., equation (2), (13)), thereby generating a determined set of equations (e.g., equation (8) substituted into equation (5), equation (19) substituted (16)), thereby determining the rendering device color space rendering error.

In operation, a color description 254 is received 112 by, for example, the color description receiver 230. The color description 254 can be part of a main or customer job description or can be part of a diagnostic job description. The color description 254 can include a color description in one or both of the rendering device color space and the sensor color space. If 130, the received 112 color description 254 includes a color description in coordinates of the rendering device color space, the rendering device color space portion of the color description 254 may be transferred directly to the rendering device controller 254 for rendering. If 130 the color description 254 does not include a description of the input, desired or target color in terms of the rendering device color space, the received 112 color description 254 may be delivered to the color description converter 238 for transformation or conversion 114 into a converted color description based on the N dimensions or separations of the rendering device color space. For example, the color description converter 238 inverts information from the map 216 to select or determine a rendering device color description that is in accord with a sensor device color space description of the received 112 input or target color.

In either case, the rendering device controller 246 receives a rendering device color space based description of a desired or target color and controls the print engine 208 in an attempt to render 118, 122 an image with the color matching the desired or target color. When the image is rendered, it is transferred to a position within a field of view of the color sensor 212. The sensor 212 measures the color of the rendered image and transmits that color, in coordinates (i.e.; no more than N−1 dimensions) of the sensor color space, to the sensor color space description comparator 222.

If 130 the received 112 color description 254 includes a color description in sensor color space coordinates, the sensor color space coordinate portion of the color description is delivered to the sensor color space color description comparator 222 at an appropriate time. For example, the sensor color space portion of the color description is stored in the color description storage device 234 until it is needed by the sensor color space description comparator 220. When the color description comparator 220 receives measurement 126 information from the sensor 212, the sensor color space portion of the received 112 color description 254 is delivered from the color description storage device 234 to the color space color description comparator 220.

If 130, the received 112 color description 254 does not include a description of the desired or target color in terms of the sensor color space then the color description 254 is delivered to the color description converter 238 either directly from the color description receiver 230 or from the color description storage device 234, depending on system 204 timing considerations. In either case, the color description converter 238 transforms or converts 134 the available color description 254 into a converted color description in terms of the sensor color space color coordinates and delivers the converted color description to the sensor color space color description comparator 220, at the appropriate time. For example, the color description converter 238 uses information from the rendering device color space to sensor color space map 216, to convert a rendering device color space portion of the color description 254 to a sensor color space coordinate description. For instance, sensor color space coordinates are pulled directly from a look-up table based on the rendering device color space coordinates in the received 112 color description 254. Alternatively, an interpolation is performed between data points that are available from the rendering device color space to sensor color space map 216. In either case, a converted color description, in sensor color space coordinates, is delivered to the sensor color space color description comparator 220.

As described above, the sensor color space color description comparator 220 then calculates 138, 142 a sensor color space rendering error, for example, a $\Delta E$ or $\Delta C$, and transfers the sensor color space rendering error information to the sensor color space to rendering device color space converter 224. The sensor color space to rendering device color space converter 224 establishes and solves appropriate equations (e.g., equation (2) or equation (13)), as described above, and makes a rendering device color space rendering error available to the rendering device error consumer 242.

The rendering error consumer 242 can be any device or process that might benefit from receiving rendering error information in terms of the rendering device or print engine 208 color space. For example, process controls associated with the rendering device controller 246 might adjust system actuators or tone reproduction curves to eliminate, reduce or compensate for the rendering device color space rendering errors. Additionally, or alternatively, machine diagnostic processes may use rendering device color space rendering error reports to evaluate system 204 health. For example, machine diagnostic processes may evaluate historical rendering device color space rendering errors in search of error patterns to detect various failure modes. Additionally, or alternatively, machine monitoring tasks may ensure that system 204 production remains within a customer or system operator specified tolerance or range of acceptability. For example, if one or more rendering device color space rendering error reports indicates that the system 204 is rendering images with a color accuracy outside an acceptable range, machine monitoring tasks may stop system 204 production and generate alarm messages or indications requesting that the system 204 or the rendering device 208 be serviced.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for calculating rendering error of a rendering device in a color space of the rendering device, the rendering device color space having N dimensions, the rendering error being calculated from measurements in a sensor color space of a sensor of the rendering device having no more than N−1 dimensions, wherein N is an integer having a value of 2 or greater, the rendering error being applicable to monitoring, diagnostics and/or control of the rendering device, the method comprising:

predetermining a mapping from coordinates in the N dimensional rendering device color space to coordinates in the sensor color space having no more than N−1 dimensions;

receiving a color description in one of the rendering device color space coordinates and the sensor device color space coordinates;

converting the color description to rendering device color space coordinates, if the color description is received in sensor color space coordinates, based on the predetermined mapping, thereby generating a converted color description;

rendering an image based on the received color description or the converted color description;

measuring a color of the rendered image with the sensor, thereby generating a measurement in sensor color space coordinates;

establishing an underdetermined system of equations relating errors expressed in sensor color space coordinates to errors expressed in rendering device color space coordinates based on the predetermined mapping;

applying an appropriate constraint to the underdetermined system of equations, thereby generating a determined set of equations; and calculating a rendering error in rendering device color space coordinates based on the predetermined mapping, the measurement and at least one of the received color description and the converted color description using the determined set of equations.

2. The method of claim 1 wherein calculating the rendering error further comprises:

converting the received color description to sensor color space coordinates, if the color description is received in rendering device color space coordinates, based on the predetermined mapping, thereby generating an expected sensor color space color description;

using the received color description as the expected sensor color space color description, if the received color description is in sensor color space coordinates;

comparing the expected sensor color space color description to the measurement, thereby determining a sensor color space rendering error, and solving the determined set of equations based on the determined sensor color space rendering error, thereby determining the rendering device color space rendering error.

3. The method of claim 1 wherein establishing the underdetermined system of equations comprises:

computing a differential relating small changes in positions in the sensor color space to small changes in positions in the rendering device color space based on the mapping from the rendering device color space coordinates to sensor color space coordinates;

establishing a system of equations relating the sensor color space rendering error to the computed differential and unknown error expressed in rendering device color space coordinates.

4. The method of claim 1 wherein applying the appropriate constraint to the underdetermined system of equations comprises:

requiring that a solution to the underdetermined system of equations be one that minimizes a sum of squares of errors in the N dimensions of the rendering device color space.

5. The method of claim 1 wherein applying the appropriate constraint to the underdetermined system of equations comprises:

requiring that a solution to the underdetermined system of equations associates all of the measured error with one of the N dimensions of the rendering device color space.

6. The method of claim 1 wherein when an initial solution to the determined set of equation includes a value that, when combined with a related value in the received color description or in the converted color description, places the combined value outside a predetermined range, solving the determined set of equations comprises:

clipping the value that places the combined value outside the predetermined range to a clipped value that places the combined value within the predetermined range; and solving a reduced set of equations without a dimension associated with the clipped value.

7. The method of claim 6 wherein when an initial solution to the reduced set of equations includes an additional value that, when combined with a related value in the received color description or in the converted color description, places the combined value outside the predetermined range, solving the determined set of equations comprises:

clipping the additional value that places the combined value outside the predetermined range to an additional clipped value that places the combined value within the predetermined range; and solving an additionally reduced set of equations without the dimension associated with the additionally clipped value.

8. The method of claim 1 wherein in the rendering device color space having N dimensions comprises a CMYK color space having four dimensions.

9. The method of claim 1 wherein in the sensor color space having no more than N−1 dimensions comprises an L*a*b* color space having three dimensions.

10. The method of claim 1 wherein in the sensor color space having no more than N−1 dimensions comprises an RGB color space having three dimensions.

11. A method for calculating colorant error in a color space of a rendering device, the rendering device color space having N dimensions, the colorant error being calculated from measurements in a sensor color space of a sensor of the rendering device having no more than N−1 dimensions, wherein N is an integer having a value of 2 or greater, in a rendering system having a mapping from coordinates in the N dimensional rendering device color space to coordinates in the sensor color space having no more than N−1 dimensions, the method comprising:
  receiving a color description in at least one of the rendering device color space coordinates and the sensor device color space coordinates;
  converting the color description to rendering device color space coordinates, if the color description is received in sensor color space coordinates, based on the mapping, thereby generating a converted color description;
  converting the received color description to sensor color space coordinates, if the color description is received in rendering device color space coordinates, based on the mapping, thereby generating an expected sensor color space color description;
  using the received color description as the expected sensor color space color description, if the received color description is in sensor color space coordinates;
  rendering an image based on the received color description or the converted color description;
  measuring a color of the rendered image, thereby generating a measurement in sensor color space coordinates;
  determining a Jacobian matrix of at least a portion of the mapping from coordinates in the rendering device color space to coordinates in the sensor color space;
  calculating a rendering error in sensor color space coordinates based on the expected sensor color space color description, and the measurement;
  creating a system of equations relating the calculated rendering error to an error expressed in rendering device color space coordinates through the Jacobian matrix and at least one additional constraining equation; and
  solving the system of equations for the rendering error expressed in rendering device color space coordinates.

12. The method of claim 11 wherein solving the system of equations comprises:
  determining an initial solution including initial offset values in each of the N dimensions of the rendering device color space;
  combining the initial offset values with related values in each of the N dimensions of the received color description or of the converted color description, whichever is in rendering device color space coordinates, thereby generating initial compensated values in each of the N dimensions of the rendering device color space;
  comparing each of the initial compensated values to a predetermined threshold value; and
  accepting the initial solution as a final solution if none of the initial compensated values is beyond the predetermined threshold value.

13. The method of claim 12 further comprising:
  clipping an initial offset value associated with one of the initial compensated values, that is beyond the predetermined threshold level, to a value, that when combined with the related value from the received or converted color description, produces a clipped compensated value that is not beyond the predetermined threshold value, thereby generating a clipped offset value;
  creating a reduced system of equations based on the Jacobian matrix and including the clipped offset value; and
  solving the reduced system of equations for any remaining unclipped values, thereby generating subsequent offset values;
  combining the subsequent offset values with their related values in each of the related dimensions of the received color description, or of the converted color description, thereby generating subsequent compensated values for remaining dimensions of the rendering device color space;
  comparing each of the subsequent compensated values to the predetermined threshold value, and
  accepting the clipped value and the subsequent offset values as the final solution, if none of the subsequent compensated values is beyond the predetermined threshold value.

14. The method of claim 13 further comprising:
  iteratively clipping further offset values, creating further reduced systems of equations, combining further subsequent offset values with their related values in each of the related dimensions of the received color description, or the converted color description, thereby generating further subsequent compensated values for remaining dimensions of the rendering device color space, comparing each of the further subsequent compensated values to the predetermined threshold value, and accepting the clipped value, subsequent offset values, and further subsequent offset values as the final solution, if none of the further subsequent compensated values is beyond the predetermined threshold value.

15. The method of claim 11 wherein determining the Jacobian matrix comprises:
  numerically differentiating values of a numerical version of the mapping from coordinates in the rendering device color space to coordinates in the sensor color space.

16. The method of claim 11 wherein determining the Jacobian matrix comprises:
  analytically differentiating the mapping from coordinates in the rendering device color space to coordinates in the sensor color space.

17. The method of claim 11 wherein determining the Jacobian matrix comprises:
  solving for the parameters of a parametric function.

18. A document rendering system comprising:
  a print engine that is operative to render images with N rendering device color separations;
  a sensor that is operative to examine output of the print engine and provide color measurements reported in N−1 sensor color space dimensions, wherein N is an integer having a value of 2 or greater;
  a map that provides information for transforming color descriptions based on the N rendering device color separations to color descriptions based on the N−1 sensor color space dimensions;

a sensor color space color description comparator that is operative to receive an expected color sensor color space color description based on a color description input to the system, to receive a sensor color space based measurement from the sensor, and to determine a difference between the expected color sensor color space color description and the measurement from the sensor, thereby generating a sensor color space rendering error signal; and a sensor color space to rendering device color space converter that is operative to receive the sensor color space rendering error signal from sensor color space color description comparator and convert it to a rendering device color space rendering error signal, based on a differentiation of information from the map wherein the sensor color space to rendering device color space converter is operative to establish an underdetermined system of equations relating rendering device color space rendering error signals to errors expressed in rendering device color space coordinates through the differentiation of information from the map, apply an appropriate constraint to the underdetermined system of equations, thereby generating a determined set of equations and solve the determined set of equations based on the determined sensor color space rendering error, thereby determining the rendering device color space rendering error.

19. A method for calculating rendering error in a rendering device color space having N dimensions from measurements in a sensor color space having no more than N−1 dimensions, the method comprising:

determining a target color of a rendered image; and calculating a rendering error in rendering device color space coordinates based on the target color, a measurement of a color of an image rendered based on the target color, the measurement being in coordinates of the no more than N−1 dimension sensor color space, and on a predetermined mapping from coordinates in the N dimensional rendering device color space to coordinates in the no more than N−1 dimension sensor color space by establishing an underdetermined system of equations relating errors expressed in sensor color space coordinates to errors expressed in rendering device color space coordinates based on the predetermined mapping, applying an appropriate constraint to the underdetermined system of equations, thereby generating a determined set of equations and using the determined set of equations to calculate the rendering error.

* * * * *